(12) United States Patent
Asanovic et al.

(10) Patent No.: US 12,517,841 B2
(45) Date of Patent: Jan. 6, 2026

(54) ERROR MANAGEMENT IN SYSTEM ON A CHIP WITH SECURELY PARTITIONED MEMORY SPACE

(71) Applicant: SiFive, Inc., San Mateo, CA (US)

(72) Inventors: Krste Asanovic, Oakland, CA (US); Yann Loisel, La Ciotat (FR); John Ingalls, San Mateo, CA (US); Shubhendu Sekhar Mukherjee, Southborough, MA (US)

(73) Assignee: SiFive, Inc., Santa Clara, CA (US)

( * ) Notice: Subject to any disclaimer, the term of this patent is extended or adjusted under 35 U.S.C. 154(b) by 9 days.

(21) Appl. No.: 18/579,134

(22) PCT Filed: Jun. 6, 2022

(86) PCT No.: PCT/US2022/032311
§ 371 (c)(1),
(2) Date: Jan. 12, 2024

(87) PCT Pub. No.: WO2023/287517
PCT Pub. Date: Jan. 19, 2023

(65) Prior Publication Data
US 2024/0303205 A1  Sep. 12, 2024

Related U.S. Application Data

(60) Provisional application No. 63/221,253, filed on Jul. 13, 2021.

(51) Int. Cl.
*G06F 12/14* (2006.01)
*G06F 21/74* (2013.01)

(52) U.S. Cl.
CPC .......... *G06F 12/1458* (2013.01); *G06F 21/74* (2013.01)

(58) Field of Classification Search
CPC ............. G06F 12/1458; G06F 12/1441; G06F 12/1491; G06F 2212/1032;
(Continued)

(56) References Cited

U.S. PATENT DOCUMENTS 8,893,267 B1 * 11/2014 Sathe .................... G06F 21/554
711/163
2005/0223183 A1 * 10/2005 Pherson ................ H04L 63/101
711/163

(Continued)

FOREIGN PATENT DOCUMENTS

TW  I729654 B  6/2021

OTHER PUBLICATIONS

Latest Trends in Hardware Security and Privacy; Giorgio Di Natale, F. Regazzoni, V. Albanese, F. Lhermet, Y. Loiselm A. Sensaoui, S. Pagliarini; Oct. 2020; 5 pages.

(Continued)

*Primary Examiner* — Khoa D Doan
(74) *Attorney, Agent, or Firm* — Kilpatrick Townsend & Stockton LLP

(57) ABSTRACT

Systems and methods are disclosed for error management in a system on a chip with a securely partitioned memory space. For example, an integrated circuit (e.g., a processor) for executing instructions includes a world identifier checker circuitry configured to check memory requests for one or more memory mapped resources that are received via the bus that have been tagged with a world identifier to determine whether to allow or reject access based on the tagged world identifier; a world identifier checker circuitry configured to compare the tagged world identifier to a world list for a resource that specifies which world identifiers supported by the integrated circuit are authorized for access to the resource; and a data store configured to store world error (Continued)

data, including the tagged world identifier of a memory request that has been rejected by the world identifier checker circuitry.

19 Claims, 7 Drawing Sheets

(58) Field of Classification Search
CPC .. G06F 2212/1052; G06F 21/74; G06F 21/53; G06F 11/0772; G06F 11/3648
See application file for complete search history.

(56) References Cited

U.S. PATENT DOCUMENTS

| | | | |
|---|---|---|---|
| 2005/0278574 A1 | 12/2005 | Kitamorn et al. | |
| 2015/0301761 A1* | 10/2015 | Sijstermans | G06F 3/0644 |
| | | | 711/163 |
| 2019/0227827 A1* | 7/2019 | Zmudzinski | G06F 21/57 |
| 2020/0076806 A1* | 3/2020 | Nassar | H04L 63/0892 |

OTHER PUBLICATIONS

SiFive WorldGuard Technical Paper SiFive Shield Open Secure Platform Architecture; Version 2.1; Jul. 2021; 46 pages.
International Search Report for international application No. PCT/US2022/032311 filed Jun. 6, 2022; Mailed Oct. 4, 2022; 62 pages.

* cited by examiner

ERROR MANAGEMENT IN SYSTEM ON A CHIP WITH SECURELY PARTITIONED MEMORY SPACE

CROSS-REFERENCE TO RELATED APPLICATIONS

This application is a 371 of International Application No. PCT/US2022/032311, filed on Jun. 6, 2022, which claims the benefit of U.S. Provisional Application 63/221,253 filed on Jul. 13, 2021. The entire contents of these applications are incorporated herein by reference in their entirety.

TECHNICAL FIELD

This disclosure relates to error management in a system on a chip with a securely partitioned memory space.

BACKGROUND

Software isolation is an important feature mandated by distinct concerns. Considering the trend of increasing code size, the different origins of the code and the ways they are combined, important risks exist that one part can impact another one, intentionally or not.

If there is a bug and the disturbance is not on purpose, there is a concern about safety: a health-oriented device (e.g., a medical device, a car brake, a nuclear plant sensor) shall maintain its capacity for its main mission, even another piece of software running on the device has bugs and goes into infinite loop or erratic behavior.

If there is a weakness and the disturbance is on purpose, there is a concern about security: a credential-oriented device (payment terminal, badge control system, DRM-equipped device) shall resist or raise a flag, and not compromise any asset it protects. It is advantageous to develop solutions that guarantee that the failure of one piece of software does not impact the correct and full functioning of other pieces, running on the same platform.

Beyond that, it is advantageous to guarantee that an aggressive or uncontrolled piece of software cannot impact a resource belonging to another piece of software running on the same platform. Impacting any resource can have a broad meaning, from simply reading a portion of memory to modifying this portion of memory or preventing from using a peripheral. Security requirements may be more demanding than safety requirements as the latter usually lead to solutions where the application code is able to change its own privilege mode while the former usually requires that the application code cannot change its privilege mode. Thus, safety schemes, usually based on regular real-time OS, often cannot comply with security requirements while the opposite is true.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
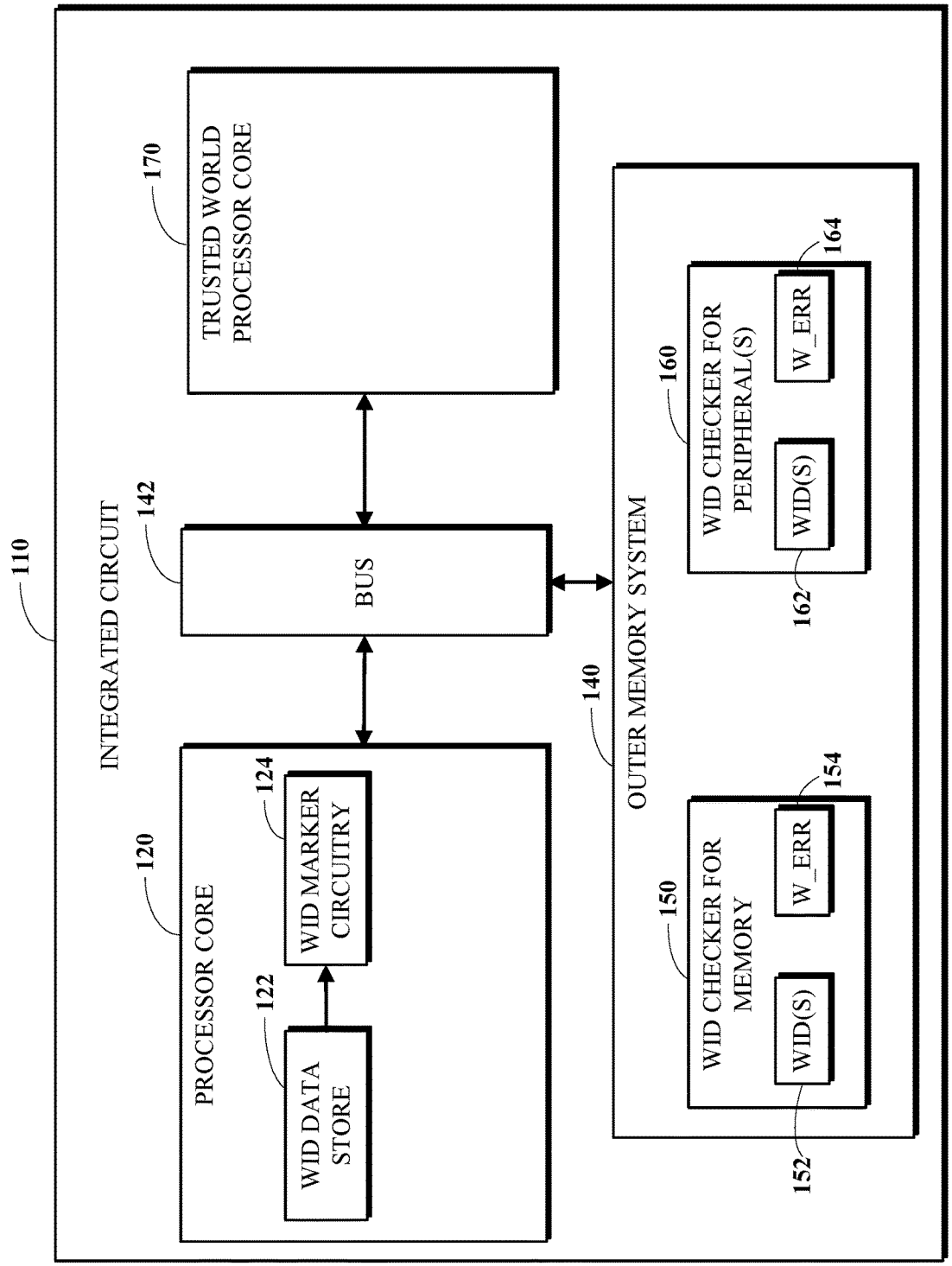
FIG. 1 is a block diagram of an example of an integrated circuit for error management in a system on a chip with a securely partitioned memory space.

A hardware-enforced multi-domain solution, such as SiFive WorldGuard, provides protection against illegal accesses to memories/peripherals from software applications and/or other masters. This solution aims to provide hardware means that guarantee strict and strong isolation between distinct software applications running on the same platform (e.g., single or multi-core) accessing shared resources (e.g., memories or peripherals) (see, e.g., "SiFive WorldGuard High-Level Specification").

A hardware-enforced multi-domain solution is applicable to a wide variety processors and software architectures. This solution proposes to create "worlds" that gather applications running on cores and other masters' resources like DMA channels and subordinate resources like memories or peripherals. The possible number of worlds is hardware configurable, depending on the number of cores and masters, on memories' configurations, and on the software architecture. This solution does not replace the physical memory protection (PMP) mechanism (applicable to one single core for the memories) but extends it to a multi-core, multi-software system with other masters.

The principle is to gather masters, memory areas and peripherals within sets of resources, named worlds. The worlds are distinct from each other, which means the software running on cores belonging to a world 1 cannot access resources (e.g., memory portions and peripherals) belonging to a world 2 and more generally cannot interfere with the other worlds. Of course, for inter-world communications, some memory portions can belong to more than one world, behaving as shared memory. So, one unique world identifier value is assigned to a world, and within this world, each of the masters belonging to the world is assigned the same world identifier value. This allocation is usually done for each master, the granularity level being the whole master. But a finer granularity can even be provided if the master design can support it. That is the case for cores, named WorldGuard-aware cores. On these cores, the world distinction can now also depend on the privileged mode, having distinct world identifiers based on the privilege mode (e.g., M-mode, S-mode, U-mode) on the same core. (See, e.g., "RISC-V Privileged Specification").

In some implementations, debug is selectively enabled for these worlds using a debug world list. For example, when a world identifier (WID) cannot be debugged, the debug interrupt and exceptions are not taken. In some implementations, when a debug interrupt is taken on a specific hart/core, the core jumps to an address (e.g., 0x800) in the debug ROM, in debug mode. At this stage, after some initialization, the debug ROM code can execute Abstract-Commands. The check mechanism is based on the use of the desr.prv, either directly (for the CSR access) or indirectly (for the data access). So, the debug ROM code: (for CSRs) performs regular access to the CSR addresses against desr-.prv and allows access only to that privilege, except for authorized CSRs; and (for memory) performs regular addresses requests with the core WID value based on the desr.prv register (instead of mstatus.prv). Therefore, accesses are granted if and only if the WID world has access to the requested address.

Note: as the RISC-V debug specification allows that "A debugger can change this value to change the hart's privilege level when exiting Debug Mode", the debugger may not be able to change the desr.prv. As for the secure authenticated debug scheme, this WorldGuard-enforced debug process may rely on firmware execution. Therefore, the robustness of this code, especially the portions where the is checked, should be addressed if fault attacks are considered.

For example, a first technique is to consider that the debug is authorized if and only if there is a debug interrupt/exception and the current WID value authorizes the debug, based on the current WID value and the debug-wid-list list.

A second technique is to focus on the way the debug ROM code accesses to access-controlled resources, the CSRs and the resources: while the debug ROM code (the one executed during debugging operations) runs in debug mode (e.g., the highest privileged mode), it does not use these privileges for the accesses and uses the privileged mode and WID value used by the debugged software. For example, the access control may be granted with the desr.prv and not the mstatus.prv, which means the access control is performed based on the rules applicable for the debugged software privilege mode and WID value, not the rules of the debugging software. This second technique may simplify a lot the check of the accesses as it reuses the WorldGuard mechanisms and principles. So, the debug ROM code may be small and the approach may be consistent with the other WorldGuard mechanisms.

For example, WorldGuard is a software isolation hardware-based solution for processor cores. It applies to physical addresses. In the rest of the document, wg might be used to denote WorldGuard.

WorldGuard is a hardware-enforced multi-domain solution that provides protection against illegal memories/peripherals accesses from software applications and/or other masters, like DMAs. It aims to provide hardware means that guarantee strict and strong isolation between distinct software applications running on the same platform (single or multi-core) accessing shared resources (memories, peripherals).

For example, the circuitry and techniques described herein may be applicable to variety of processors for many different software architectures. For example, they can be implemented using the RISC-V instruction set architecture.

This solution proposes to create "worlds" that gather applications running on cores and other masters like DMA channels and resources like memories or peripherals. A world defines permissions on physical addresses in the system, can overlap, and does not affect software-visible cache coherence. Software isolation is achieved by restricting a world's access to specific physical addresses that would be bound to different components in a system. A world in a WorldGuard-enabled system or chip will be identified by a world identifier or WID.

The possible number of worlds is hardware-configurable at elaboration stage and should be determined by the number of cores and masters, the memories configurations, and mostly the software architecture.

Mechanisms and Blocks

On the master side, wgMarkers are used to "mark" the request out of the master. The marking is based on the world the master belongs to, being a numeric value, named world identifier, unique per world. This marked request is sent to the resources/slaves blocks (memories, peripherals).

On resources/slaves, wgCheckers are positioned "in front of" the resources for checking the marked requests.

The wgCheckers contain configurations that define rules of access. For example, a rule for a memory defines a portion of this memory and the list of the worlds that can access this portion, and in which way (read or read-write). So, the verification of a marked request coming from a master is performed by comparing the couple request address-world identifier to the rules present in the wgChecker configuration.

The wgCheckers may also contain error registers and interrupt bit fields.

In some implementations, if the first rule that matches the address also matches the world identifier and the access way, the check is granted and the wgChecker authorizes the request to be satisfied in the resource. If the check fails, there is an error.

The way to configure the wgMarkers and the wgCheckers may require some privileges. In some implementations, wgMarkers not associated to a core (e.g. a DMA) and wgCheckers configurations are possible only by a trusted world. wgMarkers associated with a core can be set by local-to-the core privileges (e.g. machine mode, . . . ).

Error Management

When a marked request reaches a wgChecker, the wgChecker compares the marked requests with the wgChecker rules. If this request does not match with any of the rules, it can trigger two different events (this is optional and configurable for each wgChecker): The main event is to source an interrupt signal. This interrupt signal can be a source for the interrupt controller. In that case, an interrupt handler can be run in case a violation occurs. Any core can theoretically register to this interrupt signal. It may be preferred to have the core running for the trusted world to register to this interrupt signal, as this core may be dedicated to security monitoring.

As a second event, a denied is sent back to the master source of the error. This denied may be converted to an interrupt signal, in presence of a Bus Error Unit (BEU). The BEU is a per-processor device that records erroneous events and reports them using the PLIC (if available) or via hart-local interrupts. The BEU can be configured to generate interrupts on ECC errors if ECC is included in the design, or TileLink bus errors. In some implementations, when an error occurs, the BEU will hold the address of the error and a code to describe the error. The denied message may also trigger a core exception.

The two events above lead to the following strategy. First, a global, platform-level interrupt signal is caught by the interrupt handler in the trusted firmware, in charge of the security monitoring. This firmware may be able to receive and manage violations wherever they come from (this is its duty to do so). Second, a local, core-level interrupt signal is caught by the interrupt handler in the firmware running on the core that causes the violation. If the violation comes from a bug, the source core can be able to locally manage the problem and to, maybe, correct the issue. For single-core platforms, the trusted core and the local core may be the same core.

If the violation comes from an attack, the source core may be controlled by the attacker and so cannot be trusted for any forensic effort. Therefore, this is the trusted firmware interrupt handler, thanks to the global interrupt, that can also manage and investigate the problem.

For a deeper investigation, some information about the violation is available from the wgChecker errors registers (a wgChecker may have its own error registers): (1) the address contained in the request, (2) the world identifier associated to the request, and (3) the access mode (e.g., read, write, or execute). Note, in some implementations, this information is only accessible by the trusted world firmware.

Acknowledgment

Often a first violation will be followed by many others of the same kind. Nevertheless, it is often important to analyze the first violation as it may be the most important and the one that can give the best clues as to what went wrong. So, the error registers also include a bit field named ACK, which prevents the error registers from being updated following a new violation. It is only when the ACK bit field is set, i.e. the information above is considered as acknowledged, that the error registers can be updated with the most recent violation information.

Access Rules

Error information about a violation can be very valuable for an attacker, especially when the attack scenario is not precise (e.g., a fault attack). In some implementations, the access to the error information shall be restricted to the highest privilege world, the trusted world. This means that the world that has caused the violation cannot directly access the error registers.

So, the trusted interrupt handler can access this information and the local source-core interrupt handler cannot directly. If the latter wants these details, it shall ask the trusted interrupt handler to share this information. This is then up to the trusted firmware to determine if the source core firmware can be trusted and then the information can be shared.

As used herein, the terms "circuit" and "circuitry" refer to an arrangement of electronic components (e.g., transistors, resistors, capacitors, and/or inductors) that is structured to implement one or more functions. For example, a circuit may include one or more transistors interconnected to form logic gates that collectively implement a logical function.

As used herein, the term "data store" refers to circuitry configured to store data, such as, for example, one or more registers, random access memory, flash memory, or one or more flip-flops.

Details

FIG. 1 is a block diagram of an example of an integrated circuit 110 for error management in a system on a chip with a securely partitioned memory space. The integrated circuit 110 includes a processor core 120 configured to execute instructions. The integrated circuit 110 includes an outer memory system 140 configured to store instructions and data and to provide interfaces to peripherals. The processor core 120 includes a data store 122 configured to store one or more world identifiers, and a world identifier marker circuitry configured to tag memory requests transmitted on a bus 142 of the integrated circuit 110 by the processor core 120 with a world identifier from the data store 122. The integrated circuit 110 includes world identifier checker circuitries 150 and 160 configured to check memory requests for one or more memory mapped resources that are received via the bus 142 that have been tagged with a world identifier to determine whether to allow or reject access based on the tagged world identifier. The world identifier checker circuitries 150 is associated with one or more portions of a memory. The world identifier checker circuitries 160 is associated with one or more memory mapped peripherals. The world identifier checker circuitries 150) and 160 include one or more data stores (152 and 162) storing a world list for a resource that specifies which world identifiers supported by the integrated circuit are authorized for access to the resource. The world identifier checker circuitries 150 and 160 include one or more data stores (154 and 164) configured to store world error data, including the tagged world identifier of a memory request that has been rejected by the world identifier checker circuitry (150) or 160). The integrated circuit 110 includes a trusted world processor core 170 that has write access to data stores (e.g., registers) storing world identifiers throughout the integrated circuit 110 that are used to tag and to check memory requests on one or more buses of the integrated circuit 110. For example, the integrated circuit 110 may be used to implement the technique 500 of FIG. 5. For example, the integrated circuit 110 may be used to implement the technique 600 of FIG. 6. For example, the integrated circuit 110 may be used to implement the technique 700 of FIG. 7.

The integrated circuit 110 includes a processor core 120 configured to execute instructions. The processor core 120 includes a data store 122 (e.g., one or more registers) configured to store a first world identifier. For example, multiple world identifiers that are respectively used by processes executed by the processor core 120 in different privilege modes may be stored in the data store 122. In some implementations, a first world identifier is one of multiple world identifiers stored in the processor core 120 that are each associated with different privilege modes (e.g., machine mode, supervisor mode, and user mode). For example, the integrated circuit 110 may implement a SiFive WorldGuard process-driven scheme. In some implementations, a world identifier (e.g., a first world identifier) is associated with all processes executed by the processor core 120 (e.g., regardless of their privilege modes). For example, the integrated circuit 110 may implement a SiFive WorldGuard core-driven scheme. In some implementations, the data store 122 includes a register storing a world identifier that has a width of n bits with the number of worlds supported by the integrated circuit 110 being 2n=(number of masters+2). This register may be used to mark transactions going out of the master. The data store 122 may be memory mapped to enable the trusted world processor core 170 to write to the data store 122 to assign one or more world identifiers to one or more masters of the processor core 120. In some implementations (not shown in FIG. 1), the data store 122 may be positioned outside of the processor core 120. For example, the data store 122 may be accessed by the processor core 120 via outside wires extending out of the processor core 120.

The processor core 120 includes a world identifier marker circuitry 124. The world identifier marker circuitry 124 may be configured to tag memory requests transmitted by the processor core on a bus of the integrated circuit 110 with a world identifier to confirm authorization to access a portion of memory space addressed by the memory requests. For example, the world identifier marker circuitry 124 may be configured to tag memory requests transmitted on a bus 142 of the integrated circuit 110 by the processor core 120 with the first world identifier. For example, in the TileLink bus protocol, the userField field may be used to transmit the world identifier value with the request. For example, the world identifier marker circuitry 124 may include logic to select a world identifier associated with a privilege mode of a current process running on the processor core 120 to tag an access request for a resource (e.g., memory or a peripheral).

The integrated circuit 110 includes an outer memory system 140 configured to store instructions and data. The outer memory system 140 may include one or more memories. The outer memory system 140 may include one or more layers of cache. The outer memory system 140 may include memory mapped ports to one or more peripherals. The processor core 120 may be configured to (e.g., using the world identifier marker circuitry 124 and the data store 122 storing the one or more world identifiers) tag memory requests transmitted on a bus (e.g., the bus 142) of the integrated circuit 110 by the processor core 120 with a world identifier (e.g., the first world identifier) to confirm authorization to access a portion of memory space addressed by the memory requests.

The integrated circuit 110 includes a world identifier checker circuitry 150 configured to check memory requests for one or more memory mapped resources that are received via the bus 142 that have been tagged with a world identifier to determine whether to allow or reject access based on the tagged world identifier. In this example, the world identifier checker circuitry 150 is for a memory (e.g., a random access memory or a flash memory). For example, the world identifier checker circuitry 150 for a resource (e.g., a portion of the memory mapped to a range of addresses) may be configured to check a world identifier that has been used to tag a request on a bus 142 for that resource against a stored world list that specifies one or more world identifiers that are authorized for access to that resource. For example, a world list specifying a world identifier or set of world identifiers for a resource may be stored by a data store 152 in the world identifier checker circuitry 150 and may be set by the trusted world processor core 170. The data store 152 may be configured to store a world list for a resource that specifies which world identifiers supported by the integrated circuit 110 are authorized for access to the resource. The world identifier checker circuitry 150 may be configured to compare the tagged world identifier to the world list. In some implementations, the world list is a bit mask with one bit for each world identifier supported by the integrated circuit. For example, the world identifier checker circuitry 150 may include a WorldGuard filter. For example, the world identifier checker circuitry 150 may include a WorldGuard PMP.

If a memory request checks out (i.e., the world identifier that was used to tag the memory request is one of the world identifiers specified by the world list), the world identifier checker circuitry 150 may allow the memory request to proceed without incident to provide access to the resource. If a memory request check fails (i.e., the world identifier that was used to tag the memory request is not one of the world identifiers specified by the world list), then the memory request may be rejected by the world identifier checker circuitry 150. For example, rejecting a memory request may cause the world identifier checker circuitry 150 to, responsive to the rejection of the memory request for the resource, source an interrupt signal; and, responsive to the rejection of the memory request for the resource, send a denied message via the bus 142 in response to the memory request. For example, the trusted world processor core 170 may be configured to receive the interrupt signal.

The world identifier checker circuitry 150 includes a data store 154 configured to store world error data, including the tagged world identifier of a memory request that has been rejected by the world identifier checker circuitry 150. For example, the world error data stored in the data store 154 may include an address of a memory request that has been rejected by the world identifier checker circuitry 150. For example, the world error data stored in the data store 154 may include an access mode of a memory request that has been rejected by the world identifier checker circuitry 150. For example, the data store 154 may include an acknowledgement bit field (e.g., a one-bit field) that indicates whether world error data stored in the data store 154 has been read by an interrupt handling routine. The world identifier checker circuitry 150 may be configured to prevent writing of world error data to the data store 154 responsive to rejection of a new memory request when the acknowledgement bit field indicates that current contents of the data store 154 have not been read yet. For example, the technique 600 of FIG. 6 may be used to update the data store 154 responsive to a rejection of a memory request. In some implementations, access to the data store 154 is restricted to the trusted world processor core 170. For example, the data store 154 may include the data store 200 of FIG. 2. In this example, the data store 154 is part of the world identifier checker circuitry 150. In some implementations (not shown in FIG. 1), the data store 154 may be located outside of the world identifier checker circuitry 150 with which it is associated.

In some implementations, access to the data store 152 is restricted to the trusted world processor core 170, and the processor core 120 is configured to, responsive to receiving a denied message, send a request to the trusted world processor core 170 for information stored in the data store 154. For example, the technique 700 of FIG. 7 may be implemented by the processor core 120.

The integrated circuit 110 includes a world identifier checker circuitry 160 configured to check memory requests for one or more memory mapped resources that are received via the bus 142 that have been tagged with a world identifier to determine whether to allow or reject access based on the tagged world identifier. In this example, the world identifier checker circuitry 160 is for one or more peripherals (e.g., a serial port). For example, the world identifier checker circuitry 160 for a resource (e.g., network adapter) may be configured to check a world identifier that has been used to tag a request on a bus 142 for that resource against a stored world list that specifies one or more world identifiers that are authorized for access to that resource. For example, a world list specifying a world identifier or set of world identifiers for a resource may be stored by a data store 162 in the world identifier checker circuitry 160 and may be set by the trusted world processor core 170. The data store 162 may be configured to store a world list for a resource that specifies which world identifiers supported by the integrated circuit 110 are authorized for access to the resource. The world identifier checker circuitry 160 may be configured to compare the tagged world identifier to the world list. In some implementations, the world list is a bit mask with one bit for each world identifier supported by the integrated circuit. For example, the world identifier checker circuitry 160 may include a WorldGuard filter.

If a memory request checks out (i.e., the world identifier that was used to tag the memory request is one of the world identifiers specified by the world list), the world identifier checker circuitry 160 may allow the memory request to proceed without incident to provide access to the resource. If a memory request check fails (i.e., the world identifier that was used to tag the memory request is not one of the world identifiers specified by the world list), then the memory request may be rejected by the world identifier checker circuitry 160. For example, rejecting a memory request may cause the world identifier checker circuitry 160 to, responsive to the rejection of the memory request for the resource, source an interrupt signal; and, responsive to the rejection of the memory request for the resource, send a denied message via the bus 142 in response to the memory request. For example, the trusted world processor core 170 may be configured to receive the interrupt signal.

The world identifier checker circuitry 160 includes a data store 164 configured to store world error data, including the tagged world identifier of a memory request that has been rejected by the world identifier checker circuitry 160. For example, the world error data stored in the data store 164 may include an address of a memory request that has been rejected by the world identifier checker circuitry 160. For example, the world error data stored in the data store 164 may include an access mode of a memory request that has been rejected by the world identifier checker circuitry 160. For example, the data store 164 may include an acknowledgement bit field (e.g., a one-bit field) that indicates whether world error data stored in the data store 164 has been read by an interrupt handling routine. The world identifier checker circuitry 160 may be configured to prevent writing of world error data to the data store 164 responsive to rejection of a new memory request when the acknowledgement bit field indicates that current contents of the data store 164 have not been read yet. For example, the technique 600 of FIG. 6 may be used to update the data store 164 responsive to a rejection of a memory request. In some implementations, access to the data store 164 is restricted to the trusted world processor core 170. For example, the data store 164 may include the data store 200 of FIG. 2. In this example, the data store 164 is part of the world identifier checker circuitry 160. In some implementations (not shown in FIG. 1), the data store 164 may be located outside of the world identifier checker circuitry 160 with which it is associated.

In some implementations, access to the data store 162 is restricted to the trusted world processor core 170, and the processor core 120 is configured to, responsive to receiving a denied message, send a request to the trusted world processor core 170 for information stored in the data store 164. For example, the technique 700 of FIG. 7 may be implemented by the processor core 120.

The integrated circuit 110 includes a trusted world processor core 170 that has write access to data stores (e.g., registers) storing world identifiers throughout the integrated circuit 110 that are used to tag memory requests on one or more buses of the integrated circuit 110. The trusted world processor core 170 may also have write access to data stores in world identifier checker circuitry (150 and 160). For example, a world list may be written to the data store 152 by the trusted world processor core 170. In some implementations, the trusted world processor core 170 is the only master of the integrated circuit that has access to these data stores (122, 152, 154, 162, and 164). For example, a world list stored in the data store 152 may be set and locked during a boot routine.

In some implementations (not shown in FIG. 1), the processor core 120 may be the trusted world processor core for its integrated circuit. For example, the trusted world processor core can simply be the processor 120 core running some trusted software in the context of a trusted world. When the world changes (e.g., from the trusted world identifier to another world identifier), the processor core 120 is not considered as trusted because its state is not the trusted state.

Figure 2:
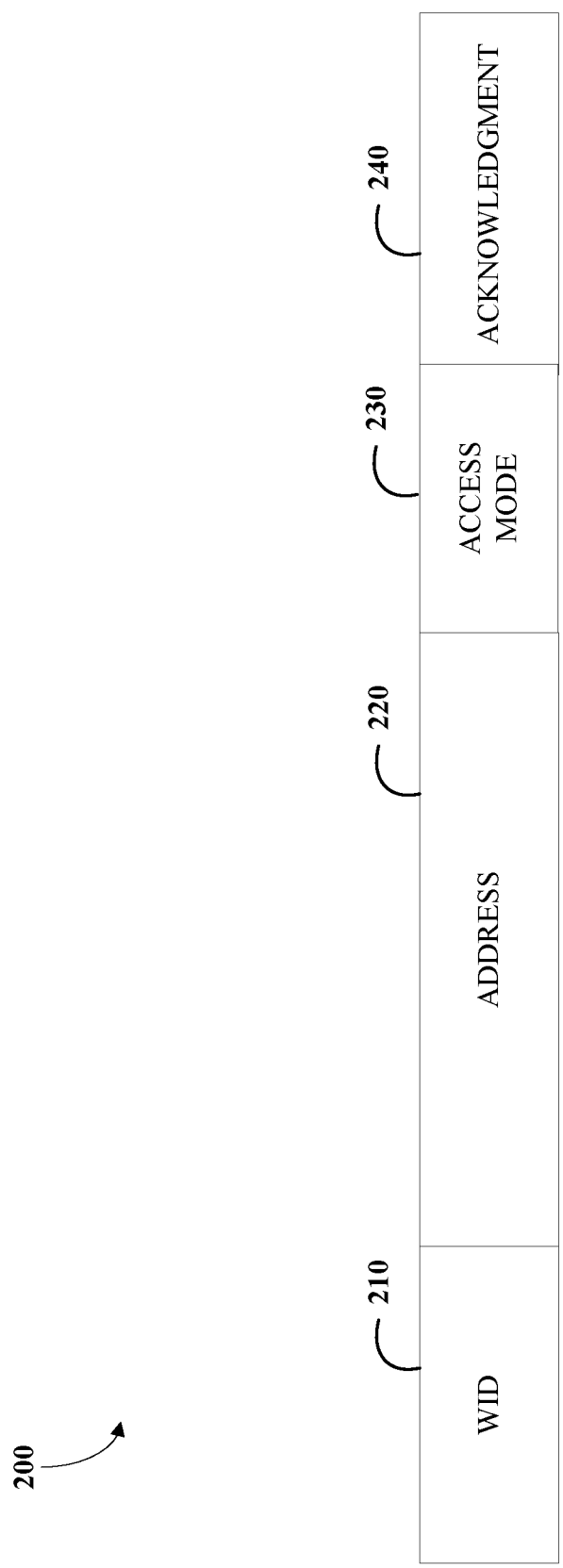
FIG. 2 is a block diagram of an example of a data store for storing world error data for a memory request that has been rejected.

FIG. 2 is a block diagram of an example of a data store 200 for storing world error data for a memory request that has been rejected. The memory request may have sought access to a memory mapped resource (e.g., a portion of memory or a peripheral). The memory request may have been rejected because its associated world identifier did not match an authorized world identifier for the resource. The data store 200 includes circuitry 210 (e.g., bits of register) configured to store a world identifier associated with (e.g., that was used to tag on a bus) the memory request. The data store 200 includes circuitry 220 (e.g., bits of register) configured to store an address of the memory request. The data store 200 includes circuitry 230 (e.g., bits of register) configured to store an access mode (e.g., read or write) of the memory request.

The data store 200 includes circuitry 240 (e.g., bits of register) configured to store acknowledgement bit field that indicates whether world error data stored in the third data store has been read by an interrupt handling routine. For example, the circuitry 240 may store a single bit indicating whether world error data stored in the third data store has been read by an interrupt handling routine. In some implementations, the world identifier checker circuitry is configured to prevent writing of world error data to the data store 200 responsive to rejection of a new memory request when the acknowledgement bit field in the circuitry 240 indicates that current contents of the data store 200 have not been read yet. For example, this feature may be useful where a first violation in sequence of violations is considered a more important indication of what caused the sequence of violations. In some implementations, access to the data store 200 may be restricted to a trusted world processor core (e.g., the trusted world processor core 170).

Figure 3:
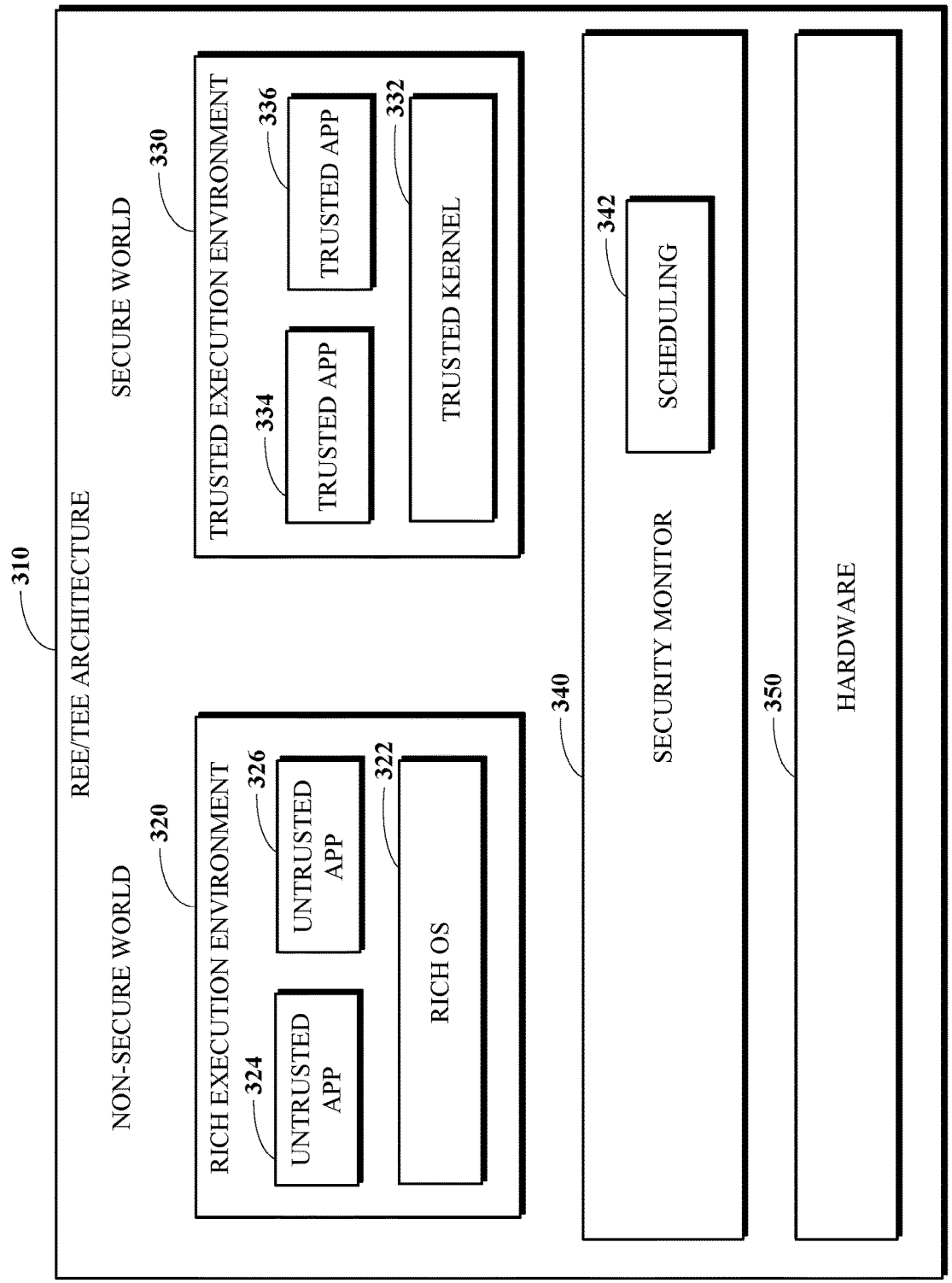
FIG. 3 is a block diagram of an example of an architecture for secure computing.

FIG. 3 is a block diagram of an example of an architecture 310 for secure computing. An example is to have a core "hosting" two worlds, the world 1 accessing the most sensitive assets (e.g. keys) and to some specific peripherals (e.g. the fingerprint reader on a smartphone), and the world 2 running generic application software. On the subordinate side, each memory or peripheral has an access control list (ACL) containing the access rights per world identifier. Through the communication bus, each marked request coming from a master is sent to a subordinate and analyzed versus its ACL. These ACL check circuits have functions very similar to the PMPs functioning with the world identifier, WID, field acting as an additional field to be checked. This mark-and-check strategy allows very complex and rich architectures to be easily secured as a wrong or missing world identifier implies the immediate rejection of the request. There is no theoretical limitation in the number of supported worlds for a specific platform, being then consistent with the software-only proposal above: the number of worlds a system on a chip (SoC) can support is application-dependent and may be determined by the application architect.

The architecture 310 includes a rich execution environment 320 that operates in a non-secure world. The rich execution environment 320 includes untrusted applications (324 and 326) that run on a rich operating system 322.

The architecture 310 includes a trusted execution environment 330 that operates in a secure world. The trusted execution environment 330 includes trusted applications (334 and 336) that run on a trusted kernel 332.

The architecture 310 includes a security monitor 340. The security monitor 340 is in charge of switches management between secure and non-secure states. The security monitor 340 may manage the context switches (e.g., save and restore). The security monitor 340 is also in charge of interrupts handling. The security monitor 340 includes a scheduling module 342. The architecture 310 includes hardware 350 which may be a single processor core or multiple processor cores.

For example, the untrusted applications (324 and 326) and the rich operating system 322 may be associated with a first world identifier that their resource (e.g., memory or peripheral) access requests are tagged with. For example, the trusted applications (334 and 336) and the trusted kernel 332 may be associated with a second world identifier that their resource (e.g., memory or peripheral) access requests are tagged with.

Figure 4:
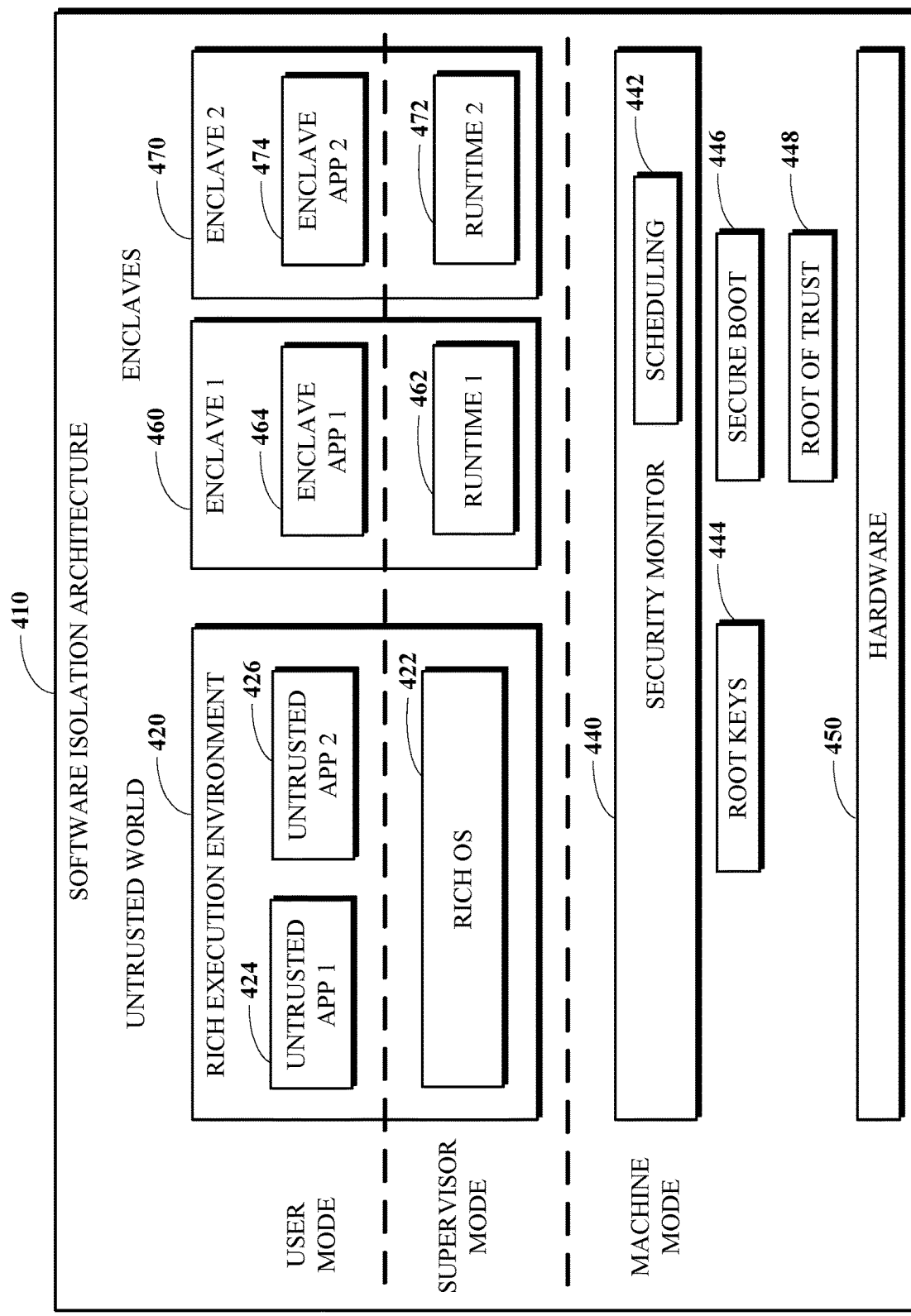
FIG. 4 is a block diagram of an example of an architecture for software isolation on a single core.

FIG. 4 is a block diagram of an example of an architecture 410 for software isolation on a single core. The architecture 410 includes a rich execution environment 420 running in an untrusted world. The rich execution environment 420 includes untrusted applications (424 and 426) running on a rich operating system 422.

The architecture 410 includes a security monitor 440. The security monitor 440 includes a scheduling module 442. The architecture 410 includes root keys 444, a secure boot module 446, and a root of trust 448. The architecture 410 includes hardware 450 which, in this example, is a single processor core.

The architecture 410 includes a first enclave 460 that includes an enclave application 464 running on a runtime operating system 462. The architecture 410 includes a second enclave 470 that includes an enclave application 474 running on a runtime operating system 472.

The untrusted applications (424 and 426) and the enclave applications (464 and 474) may use the privilege mode of user mode. The rich operating system 422 and the runtime operating systems (462 and 472) may use the privilege mode of supervisor mode. The security monitor 440, the root keys 444, the secure boot module 446, and the root of trust 448 may use the privilege mode of machine mode.

In some implementations, the untrusted applications (424 and 426) and the rich operating system 422 use a shared world identifier. For example, the security monitor 440, the root keys 444, the secure boot module 446, and the root of trust 448 may all use a common trusted world identifier. For example, the enclave applications (464 and 474) and the runtime operating systems (462 and 472) may each have their own unique world identifiers.

Examples of architectures are described in FIG. 3 (REE/TEE architecture) and FIG. 4 (Keystone enclave solution). This approach is based on a secure monitor, able to manage the different independent pieces of software. These pieces can be named boxes, containers, or blocks but the idea is to have them not managing the privilege modes, as this function is only available to the security monitor 440. The boxes resources (memories, peripherals) and Inter-boxes communications are also dynamically controlled and allocated by the hypervisor, upon request from the boxes.

On very flexible platforms, such as RISC-V-based products, it may be advantageous to attribute any important function or task to only one single container, separated from the others: one container for the cryptographic, another one for the communication library, one for the data sensors, one for the main application. An example of a software architecture would be to have the secure monitor running in machine mode (M-mode), controlling containers. Each of the containers could be made of two parts, one, the operating system, running in supervisor mode (S-mode) and the application task, running in user mode (U-mode).

The debug mechanisms may be adapted to conform to the WorldGuard principles and the platform configuration. If required, the debug shall be prevented for certain worlds, for their software and their resources (e.g., memories and peripherals). This scenario is typical of a software architecture where some portions of the code, for example the TEE or the secure enclave, are not accessible to the application developer and so shall not be available to the debug module while the application that is currently developed shall be available to the debug module.

For example, a world associated with a rich execution environment may be available for application debugging while the other worlds (security monitor, enclaves) may not.

For example, consider a WorldGuard platform with a maximum number of NWorlds worlds. A debugwid-list list may be set that is made of NWorlds bits, each bit representing a WID value (among all the possible worlds values) and the ability for the debug module to perform debugging operations for this WID value (i.e., debugging software running on the core with this current WID value). Therefore, a combinatorial function of wgMarker WID value and the debugwid-list information generates a final debug-wg-authorized signal. This signal may then be combined with other signals that prevent debug for non-authorized WIDs. This signal is used to allow or prevent the debug interrupt to be taken and to jump to the debug handler in debug ROM. In some implementations, the debug interrupt signal itself still reaches the core, but the debug-wg-authorized signal decides whether to take the interrupt or ignore it. As a result, the debug ROM code is not used when the WID debug is not authorized.

Assuming now the debug is authorized and so, the debug interrupt has been taken, the debug operations may be to access some CSRs and/or some data in the memory. Therefore, care may be taken to validate the access of these CSRs with the current WID value. Similarly, the data access may be granted according to the data address consistency with the current WID value. However, as the debug ROM code runs in debug mode which grants any access, the privileged mode used for the access control shall come from the desr.prv instead of the mstatus.prv. This rule may imply some modifications and some consequences. For example, one modification is that the hardware logic in the CSR module of the processor core may be modified to check dcsr.prv instead of mstatus.prv against the CSR number, if the mstatus.prv is the debug mode.

Figure 5:
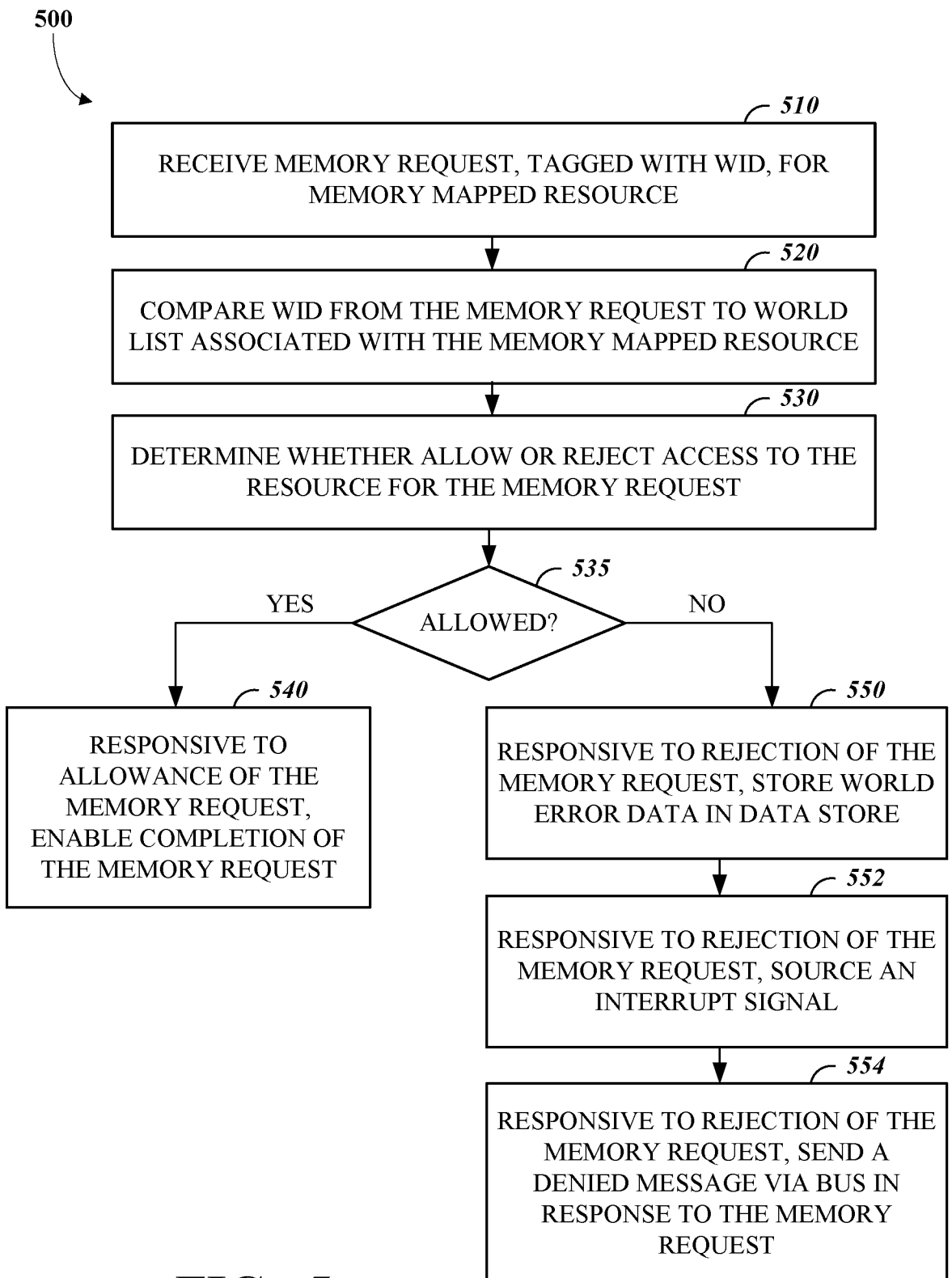
FIG. 5 is a flow chart of an example of a technique for error management in a system on a chip with a securely partitioned memory space.

FIG. 5 is a flow chart of an example of a technique 500 for error management in a system on a chip with a securely partitioned memory space. The technique 500 includes receiving 510, via a bus, a memory request, tagged with a first world identifier, for a memory mapped resource: comparing 520 the first world identifier from the memory request to a world list associated with the memory mapped resource; and based on the comparison of the first world identifier with the world list, determining 530 whether to allow or reject access to the resource for the memory request. At 535, if the memory request is allowed, then the technique 500 includes, responsive to the allowance of the memory request, enabling 540 completion of the access requested by the memory request. At 535, if the memory request is rejected, then the technique 500 includes, responsive to rejection of access to the resource for the memory request, storing 550 world error data, including the first world identifier, in a data store (e.g., the data store 200). The technique 500 also includes, responsive to the rejection of the memory request for the resource, sourcing 552 an interrupt signal; and, responsive to the rejection of the memory request for the resource, sending 554 a denied message via the bus in response to the memory request. For example, the technique 500 may be implemented using the integrated circuit 110 of FIG. 1.

The technique 500 includes receiving 510, via a bus from a processor core, a memory request for a memory mapped resource (e.g., a portion of memory or a peripheral). The memory request is tagged with a world identifier (e.g., a first world identifier). In some implementations, the memory request is transmitted on the bus using a bus protocol (e.g., the TileLink bus protocol). For example, in the TileLink bus protocol, the userField field may be used to transmit the world identifier value with the request. For example, a world identifier associated with a privilege mode of a current process running on the processor core (e.g., the processor core 120) may have been selected to tag an access request for a resource. In some implementations, the world identifier is the only world identifier used by the processor core. For example, the memory request may be received 510 by a slave (e.g., a memory controller) connected to the bus and this slave may implement world identifier checker logic (e.g., using the world identifier checker circuitry 150).

The technique 500 includes comparing 520 the first world identifier from the memory request to a world list associated with the memory mapped resource. The world list specifies which world identifiers supported by an integrated circuit are authorized for access to the resource. For example, the world list may be stored as a list of world identifiers, and the first world identifier may be compared 520 by applying logic to determine if the first world identifier is equal to one of the world identifiers stored in the world list. In some implementations, the world list is stored as a bit mask with one bit for each world identifier supported by the integrated circuit, and the first world identifier may be compared 520 by applying shift logic to determine if the bit of the world list corresponding to the first world identifier is active (e.g., active high or active low).

The technique 500 includes, based on the comparison of the first world identifier with the world list, determining 530 whether to allow or reject access to the resource for the memory request. For example, if the comparison indicates that the first world identifier is a member of the set of authorized worlds encoded by the world list, then the memory request may be determined 530 to be allowed. Otherwise, the memory request may be determined 530 to be rejected.

At 535, if the memory request is allowed, then the technique 500 includes, responsive to allowance of the memory request, enabling 540 completion of the access (e.g., writing to or reading from the resource) requested by the memory request.

At 535, if the memory request is rejected, then the technique 500 includes, responsive to rejection of access to the resource for the memory request, storing 550 world error data in a data store (e.g., the data store 154 or the data store 164). The world error data may include the first world identifier from the memory request. For example, the world error data stored 550 in the data store may include an address of the memory request. For example, the world error data stored 550 in the data store may include an access mode (e.g., read, write, or execute) of the memory request. For example, the world error data stored 550 in the data store may include an acknowledgement bit field (e.g., a single bit) that indicates whether world error data stored in the data store has been read by an interrupt handling routine. The acknowledgement bit field may be used to preserve error data for a first violation in a sequence of violation until it can be accessed (e.g., by an interrupt handling routine). In some implementations, the technique 500 includes preventing writing of world error data to the data store responsive to rejection of a new memory request when the acknowledgement bit field indicates that current contents of the data store have not been read yet. For example, the technique 600 of FIG. 6 may be implemented to selectively update a data store (e.g. a register) holding the world error data. In some implementations, access to the data store (e.g., the data store 162 is restricted to a trusted world processor core.

The technique 500 includes, responsive to the rejection of the memory request for the resource, sourcing 552 an interrupt signal. For example, this interrupt signal can be a source for the interrupt controller. In that case, an interrupt handler can be run in case a violation occurs. Any core can theoretically register to this interrupt signal. It may be preferred to have the core running for the trusted world to register to this interrupt signal, as this core may be dedicated to security monitoring. For example, a trusted world processor core (e.g., the trusted world processor core 170) may be configured to receive the interrupt signal. For single-core platforms, the trusted core and the local core may be the same core.

The technique 500 includes, responsive to the rejection of the memory request for the resource, sending 554 a denied message via the bus in response to the memory request. In some implementations, access to the data store is restricted to a trusted world processor core, and the technique 500 includes, responsive to receiving the denied message, sending a request to the trusted world processor core for information stored in the data store. For example, the technique 700 of FIG. 7 may be implemented to request information stored in this data store from the trusted world processor core.

Figure 6:
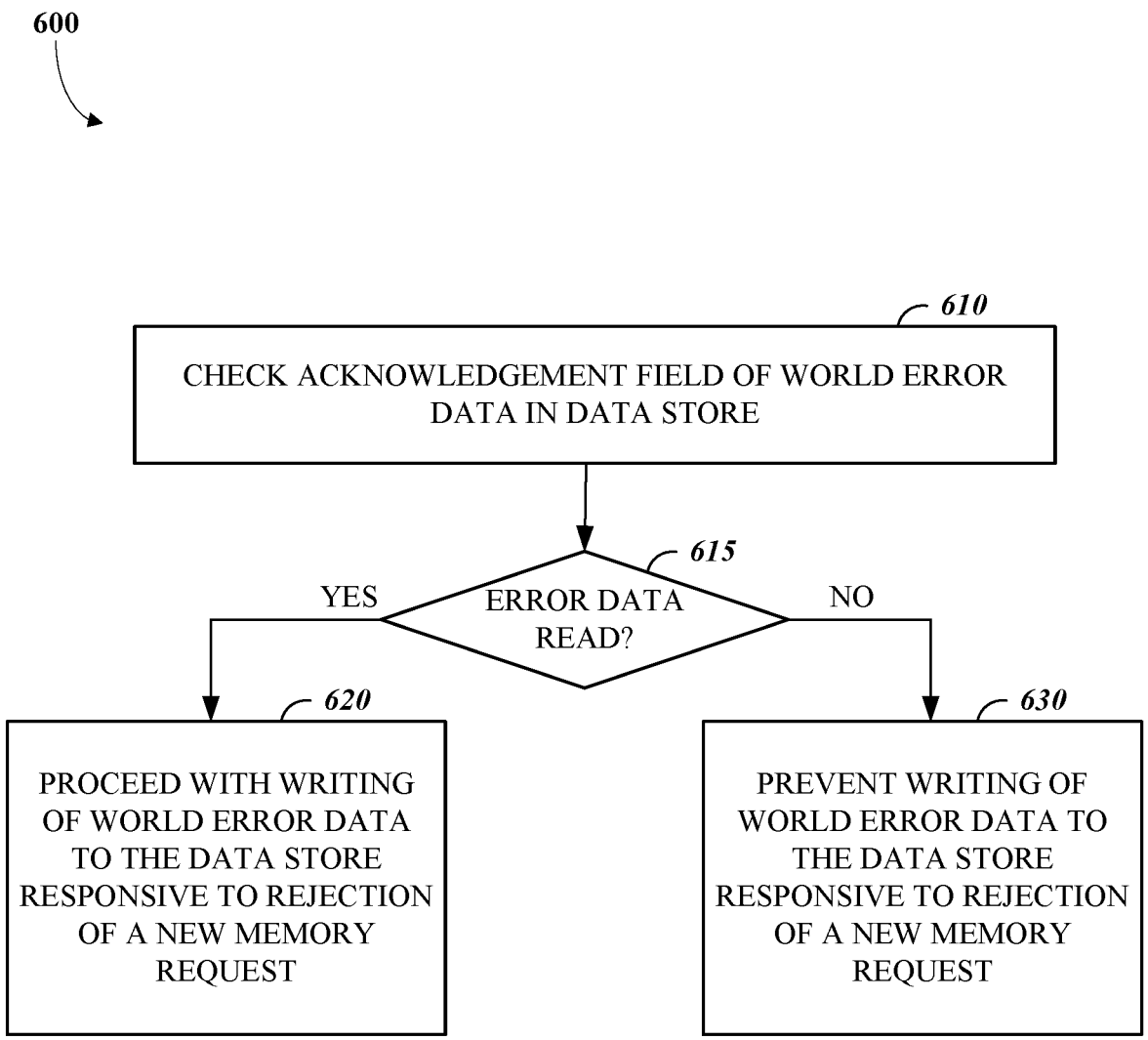
FIG. 6 is a flow chart of an example of a technique for writing world error data to a data store with an acknowledgement field, responsive to rejection of a new memory request.

FIG. 6 is a flow chart of an example of a technique 600 for writing world error data to a data store with an acknowledgement field (e.g., responsive to rejection of a new; memory request. For example, the data store includes an acknowledgement bit field that indicates whether world error data stored in the data store has been read by an interrupt handling routine. A first violation may be followed by many others of the same kind. Nevertheless, it is often important to analyze the first violation as it may be the most important and the one that provides the best clues as to what went wrong. So, the error registers also include a bit field named ACK, which prevents the error registers from being updated following a new violation. It is only when the ACK bit field is set, i.e. the information above is considered as acknowledged, that the error registers can be updated with the most recent violation information.

The technique 600 includes checking 610 an acknowledgement bit field of world error data stored in a date store (e.g., a register). For example, the acknowledgement bit field may be initialized to indicate the data has not been read when the world error data is written to the data store responsive to a rejection of a memory request. For example, the acknowledgement bit field may be updated to indicate the data has been read when an interrupt handling routine reads the valued store in the data store.

At 615, if the acknowledgement bit field indicates the world error data has been read, then the technique 600 includes proceeding with writing 620 of world error data to the data store (e.g., the data store 200) responsive to rejection of a new memory request.

At 615, if the acknowledgement bit field indicates the world error data has not been read, then the technique 600 includes preventing 630 writing of world error data to the data store responsive to rejection of a new memory request when the acknowledgement bit field indicates that current contents of the data store have not been read yet.

Figure 7:
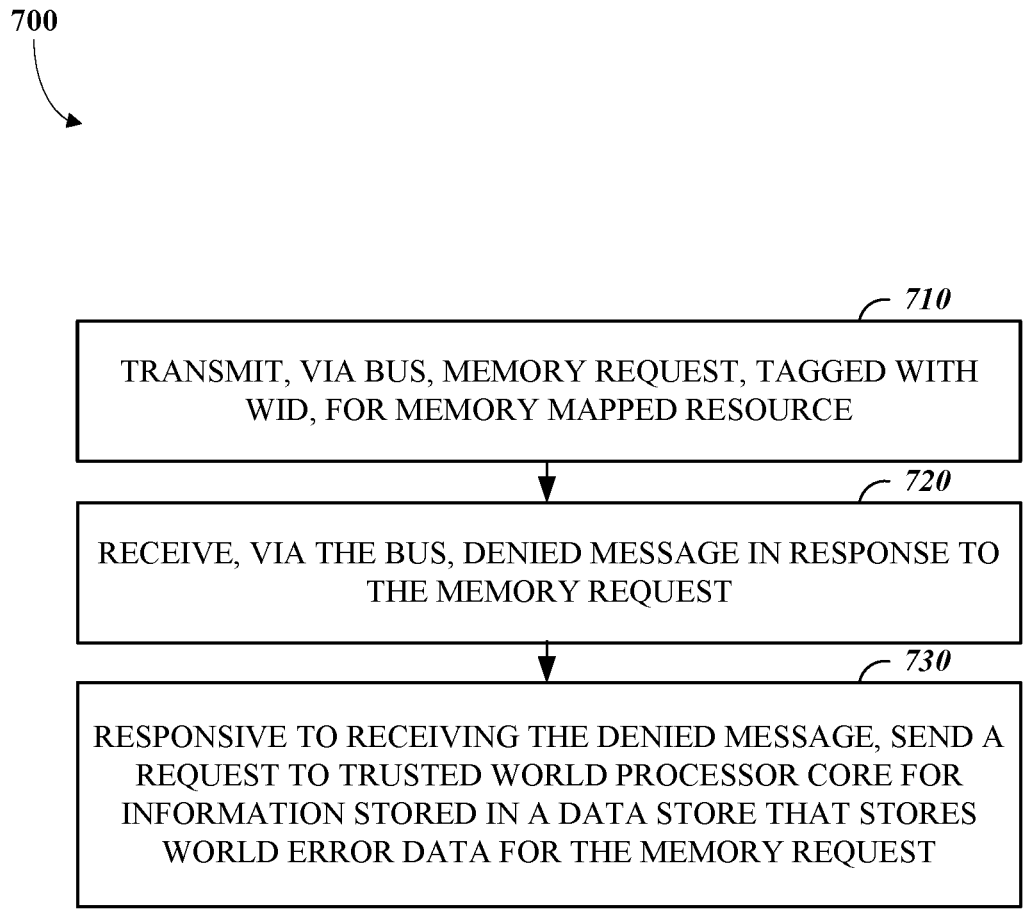
FIG. 7 is a flow chart of an example of a technique for requesting world error information from a trusted world processor core from a master using a different world identifier.

FIG. 7 is a flow chart of an example of a technique 700 for requesting world error information from a trusted world processor core from a master using a different world identifier. The technique 700 includes transmitting 710, via a bus from a processor core, a memory request for a memory mapped resource (e.g., a peripheral or a portion of a memory mapped to a range of addresses). The memory request may be tagged with a first world identifier. The memory request is tagged with a world identifier (e.g., a first world identifier) . In some implementations, the memory request is transmitted 710 on the bus using a bus protocol (e.g., the TileLink bus protocol). For example, in the TileLink bus protocol, the userField field may be used to transmit the world identifier value with the request. For example, a world identifier associated with a privilege mode of a current process running on the processor core (e.g., the processor core 120) may have been selected to tag an access request for a resource. In some implementations, the world identifier is the only world identifier used by the processor core.

The technique 700 includes receiving 720, via the bus at the processor core, a denied message in response to the memory request. For example, a world identifier checker circuitry (e.g., the world identifier checker circuitry 150) of a memory controller may have sent the denied message responsive to rejecting the memory request for having a world identifier that was not included in the world list for the resource.

The technique 700 includes, responsive to receiving the denied message, sending 730 a request from the processor core to a trusted world processor core for information stored in a data store. The data store (e.g., the data store 200) stores world error data for the memory request and access to the data store is restricted to a trusted world processor core (e.g., the trusted world processor core 170). A process running on the trusted world processor core may then decide whether to share information in the data store with the requesting processor core.

In a first aspect, the subject matter described in this specification can be embodied in an integrated circuit for executing instructions that includes a processor core configured to execute instructions: a first data store configured to store a first world identifier: a world identifier marker circuitry configured to tag memory requests transmitted on a bus of the integrated circuit by the processor core with the first world identifier: a world identifier checker circuitry configured to check memory requests for one or more memory mapped resources that are received via the bus that have been tagged with a world identifier to determine whether to allow or reject access based on the tagged world identifier: a second data store configured to store a world list for a resource that specifies which world identifiers supported by the integrated circuit are authorized for access to the resource, wherein the world identifier checker circuitry is configured to compare the tagged world identifier to the world list; and a third data store configured to store world error data, including the tagged world identifier of a memory request that has been rejected by the world identifier checker circuitry.

In the first aspect, the world error data stored in the third data store may include an address of the memory request that has been rejected by the world identifier checker circuitry: In the first aspect, the world error data stored in the third data store may include an access mode of the memory request that has been rejected by the world identifier checker circuitry. In the first aspect, the third data store may include an acknowledgement bit field that indicates whether world error data stored in the third data store has been read by an interrupt handling routine. In the first aspect, the world identifier checker circuitry may be configured to prevent writing of world error data to the third data store responsive to rejection of a new memory request when the acknowledgement bit field indicates that current contents of the third data store have not been read yet. In the first aspect, access to the third data store may be restricted to a trusted world processor core. In the first aspect, the world identifier checker circuitry may be configured to, responsive to the rejection of the memory request for the resource, source an interrupt signal; and, responsive to the rejection of the memory request for the resource, send a denied message via the bus in response to the memory request. In the first aspect, a trusted world processor core may be configured to receive the interrupt signal. In the first aspect, access to the third data store may be restricted to a trusted world processor core, and the processor core may be configured to, responsive to receiving the denied message, send a request to the trusted world processor core for information stored in the third data store. In the first aspect, the third data store may be part of the world identifier checker circuitry.

In a second aspect, the subject matter described in this specification can be embodied in methods that include receiving, via a bus from a processor core, a memory request for a memory mapped resource, wherein the memory request is tagged with a first world identifier: comparing the first world identifier from the memory request to a world list associated with the memory mapped resource, wherein the world list specifies which world identifiers supported by an integrated circuit are authorized for access to the resource: based on the comparison of the first world identifier with the world list, determining whether to allow or reject access to the resource for the memory request; and, responsive to rejection of access to the resource for the memory request, storing world error data in a data store, wherein the world error data includes the first world identifier from the memory request.

In the second aspect, the methods may include, responsive to the rejection of the memory request for the resource, sourcing an interrupt signal; and, responsive to the rejection of the memory request for the resource, sending a denied message via the bus in response to the memory request. In the second aspect, a trusted world processor core may be configured to receive the interrupt signal. In the second aspect, access to the data store may be restricted to a trusted world processor core, and the methods may include, responsive to receiving the denied message, sending a request to the trusted world processor core for information stored in the data store. In the second aspect, the world error data stored in the data store may include an address of the memory request. In the second aspect, the world error data stored in the data store may include an access mode of the memory request. In the second aspect, the data store may include an acknowledgement bit field that indicates whether world error data stored in the data store has been read by an interrupt handling routine. In the second aspect, the methods may include preventing writing of world error data to the data store responsive to rejection of a new memory request when the acknowledgement bit field indicates that current contents of the data store have not been read yet. In the second aspect, access to the data store may be restricted to a trusted world processor core.

In a third aspect, the subject matter described in this specification can be embodied in methods that include transmitting, via a bus from a processor core, a memory request for a memory mapped resource, wherein the memory request is tagged with a first world identifier; receiving, via the bus at the processor core, a denied message in response to the memory request; and, responsive to receiving the denied message, sending a request from the processor core to a trusted world processor core for information stored in a data store, wherein data store stores world error data for the memory request and access to the data store is restricted to the trusted world processor core.

In the third aspect, the memory mapped resource may be a peripheral. In the third aspect, the memory mapped resource may be a portion of a memory mapped to a range of addresses.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
   a processor core configured to execute instructions;
   a first data store configured to store a first world identifier;
   a world identifier marker circuitry configured to tag memory requests transmitted on a bus of the integrated circuit by the processor core with the first world identifier;
   a world identifier checker circuitry configured to check memory requests for one or more memory mapped resources that are received via the bus that have been tagged with a world identifier to determine whether to allow or reject access based on the tagged world identifier;
   a second data store configured to store a world list for a resource that specifies which world identifiers supported by the integrated circuit are authorized for access to the resource, wherein the world identifier checker circuitry is configured to compare the tagged world identifier to the world list; and
   a third data store configured to store world error data, including the tagged world identifier of a memory request that has been rejected by the world identifier checker circuitry.

2. The integrated circuit of claim 1, in which the world error data stored in the third data store includes an address of the memory request that has been rejected by the world identifier checker circuitry.

3. The integrated circuit of claim 1, in which the world error data stored in the third data store includes an access mode of the memory request that has been rejected by the world identifier checker circuitry.

4. The integrated circuit of claim 1, in which the third data store includes an acknowledgement bit field that indicates whether world error data stored in the third data store has been read by an interrupt handling routine.

5. The integrated circuit of claim 4, in which the world identifier checker circuitry is configured to prevent writing of world error data to the third data store responsive to rejection of a new memory request when the acknowledgement bit field indicates that current contents of the third data store have not been read yet.

6. The integrated circuit of claim 1, in which access to the third data store is restricted to a trusted world processor core.

7. The integrated circuit of claim 1, in which the world identifier checker circuitry is configured to:
   responsive to the rejection of the memory request for the resource, source an interrupt signal; and
   responsive to the rejection of the memory request for the resource, send a denied message via the bus in response to the memory request.

8. The integrated circuit of claim 7, in which a trusted world processor core is configured to receive the interrupt signal.

9. The integrated circuit of claim 7, in which access to the third data store is restricted to a trusted world processor core, and the processor core is configured to:
   responsive to receiving the denied message, send a request to the trusted world processor core for information stored in the third data store.

10. The integrated circuit of claim 1, in which the third data store is part of the world identifier checker circuitry.

11. A method comprising:
    receiving, via a bus from a processor core, a memory request for a memory mapped resource, wherein the memory request is tagged with a first world identifier;
    comparing the first world identifier from the memory request to a world list associated with the memory mapped resource, wherein the world list specifies which world identifiers supported by an integrated circuit are authorized for access to the resource;
    based on the comparison of the first world identifier with the world list, determining whether to allow or reject access to the resource for the memory request; and
    responsive to rejection of access to the resource for the memory request, storing world error data in a data store, wherein the world error data includes the first world identifier from the memory request and an address of the memory request.

12. The method of claim 11, comprising:
    responsive to the rejection of the memory request for the resource, sourcing an interrupt signal; and
    responsive to the rejection of the memory request for the resource, sending a denied message via the bus in response to the memory request.

13. The method of claim 12, in which a trusted world processor core is configured to receive the interrupt signal.

14. The method of claim 12, in which access to the data store is restricted to a trusted world processor core, and comprising:
    responsive to receiving the denied message, sending a request to the trusted world processor core for information stored in the data store.

15. The method of claim 11, in which the world error data stored in the data store includes an access mode of the memory request.

16. The method of claim 11, in which the data store includes an acknowledgement bit field that indicates whether world error data stored in the data store has been read by an interrupt handling routine.

17. The method of claim 16, comprising:
    preventing writing of world error data to the data store responsive to rejection of a new memory request when the acknowledgement bit field indicates that current contents of the data store have not been read yet.

18. The method of claim 11, in which access to the data store is restricted to a trusted world processor core.

19. A method comprising:
   transmitting, via a bus from a processor core, a memory request for a memory mapped resource, wherein the memory request is tagged with a first world identifier;
   receiving, via the bus at the processor core, a denied message in response to the memory request; and
   responsive to receiving the denied message, sending a request from the processor core to a trusted world processor core for information stored in a data store, wherein data store stores world error data for the memory request and access to the data store is restricted to the trusted world processor core.

* * * * *